April 13, 1926. 1,580,269
A. H. WHITE
PROCESS FOR REGENERATING BLACK LIQUOR
Filed April 2, 1925
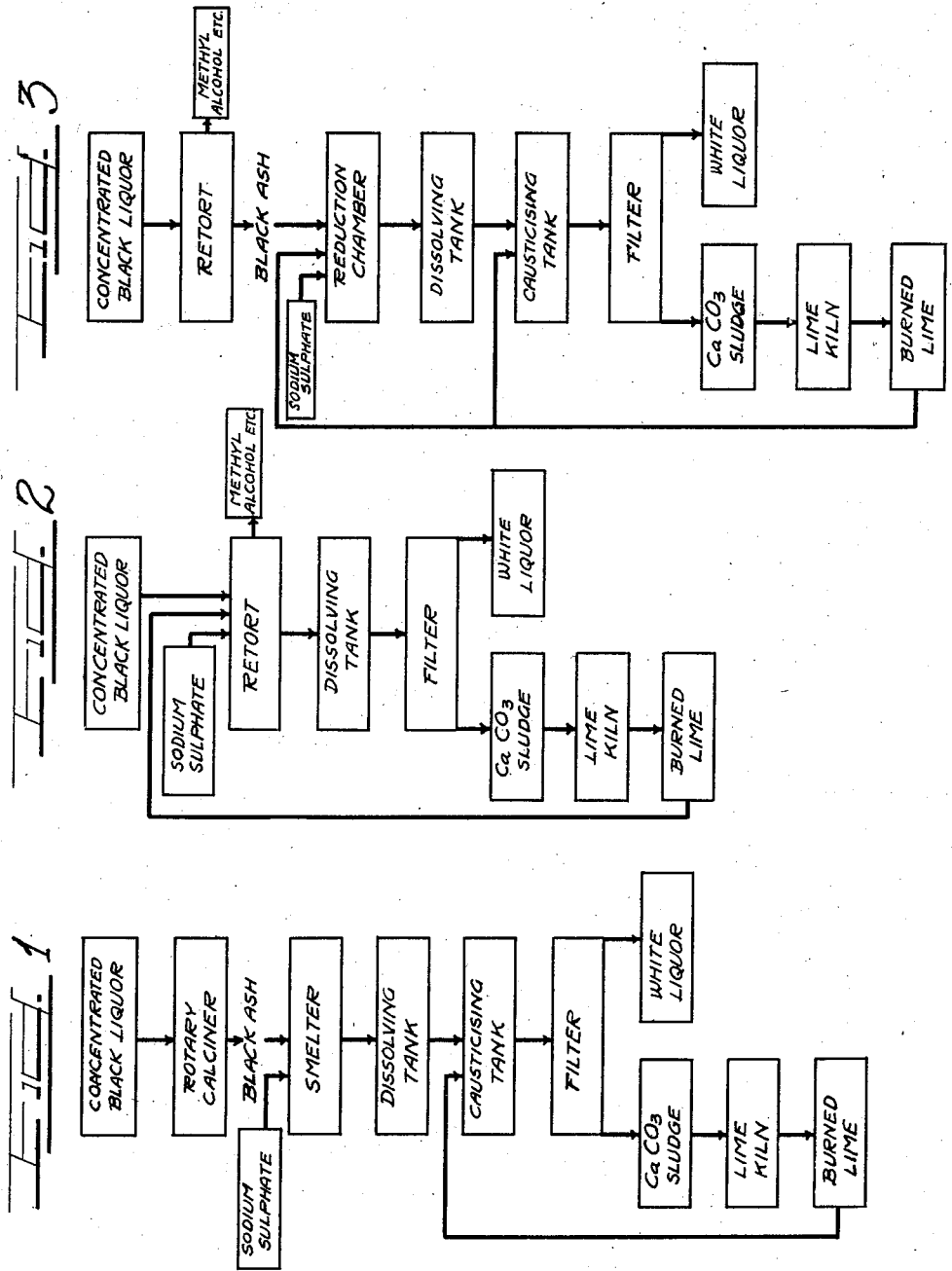

Patented Apr. 13, 1926.

1,580,269

UNITED STATES PATENT OFFICE.

ALFRED H. WHITE, OF ANN ARBOR, MICHIGAN, ASSIGNOR TO JOHN E. ALEXANDER, OF PORT EDWARDS, WISCONSIN, AND E. G. GOODELL, OF STEVENS POINT, WISCONSIN, TRUSTEES.

PROCESS FOR REGENERATING BLACK LIQUOR.

Application filed April 2, 1925. Serial No. 20,046.

*To all whom it may concern:*

Be it known that I, ALFRED H. WHITE, a citizen of the United States, and a resident of the city of Ann Arbor, in the county of Washtenaw and State of Michigan, have invented certain new and useful Improvements in a Process for Regenerating Black Liquor; and I hereby declare that the following is a full, clear, and exact description of the same, reference being had to the accompanying drawings, and to the numerals of reference marked thereon, which form a part of this specification.

This invention relates to the regeneration of "black liquor" used in the sulphate process of paper pulp manufacture.

According to this process, the pulp is treated with a mixture of sodium hydroxide and sodium sulphide, the socalled "white liquor" to dissolve the lignin and other constituents of the wood and release the cellulose fibres.

The liquor after dissolving the lignin called "black liquor" consists of sodium salts of organic acids, such as acetic, etc., some sodium carbonate, sulphate and unchanged hydroxide and sulphide. The alkaline material in the black liquor is recovered by first eliminating the organic matter, then converting the sodium sulphate into sulphide by reduction with carbonaceous material and finally causticizing the sodium carbonate by means of lime.

In practice as now commonly carried out, the dilute black liquors are concentrated in vacuum evaporators or by waste heat to a thick syrup which is burned in a rotary furnace to give a mixture of sodium carbonate, sulphate and sulphide with solid carbon known as "black ash". This black ash is mixed with additional sodium sulphate to make up losses and is thrown into a smelter which is provided with an air blast at the bottom. The combustion of the carbon in the black ash, and any additional fuel which may be added, gives strong reducing conditions and a temperature high enough to melt the sodium salts which flow from the bottom of the smelter as a mixture consisting mainly of sodium carbonate and sodium sulphide. This molten stream of fused salts falls into a tank of water where the salts are dissolved. The solution is pumped to the causticizing tank where milk of lime is added to convert the sodium carbonate into caustic soda with the precipitation of calcium carbonate. The clear solution separated from the sludge is known as "white liquor" and is put back into the digester with a fresh charge of wood. The calcium carbonate sludge is either thrown away or reburned to lime and put back into the causticizing tank.

The principal objects of the present invention are to improve, simplify and cheapen the regeneration of such "black liquors".

Other and further important objects of the invention will be apparent from the disclosure in the following description which sets forth the preferred form of my invention.

In the drawings:

Figure 1 is the flow sheet of the regeneration process as ordinarily carried out.

Figure 2 is the flow sheet of my improved process.

Figure 3 is the flow sheet of an alternative form of my improved process.

In my co-pending application, Serial No. 744,410, filed October 18th, 1924, it was pointed out that whereas sodium sulphate was ordinarily not reduced by carbon at a temperature below 950° C. it could be easily reduced to sulphide at 600° to 700° C., or even lower temperature, in the presence of an oxide, such as lime, capable of combining with carbon dioxide at such temperature. In view of this, lime should be added prior to smelting or otherwise treating the sulphate containing mass to form sulphide. This desirable object would be attained by adding the lime to the black ash.

Preferably, however, the lime is added earlier to aid in the production of useful destructive distillation products during the formation of the "black ash".

The carbonization step is ordinarily carried out so that the organic matter is wholly lost. However, in my earlier Patent No. 1,374,889, I have described a process in which methyl alcohol, acetone and the like are recovered. According to this prior process, lime was added to the concentrated black liquor to combine with the water and thus produce sufficient heat to distill off methyl alcohol, acetone and other useful products. After the lime has served this useful function, it is ready for aiding in the reduction of the sulphate in the next step of the process. Further, as the amount added in the first step is more than sufficient for the absorption of carbon dioxide in the reduction step, when the product of the latter step of the process is dissolved in water, the excess lime causticizes the sodium carbonate present.

The heat required for the destructive distillation is produced by the formation of the hydroxide according to the equation:

$$CaO+H_2O=Ca(OH)_2+8,640.$$

During the destructive distillation a certain amount of carbon dioxide is formed and the absorption of this gas by the lime also generates heat:

$$CaO+CO_2=CaCO_3+43,300.$$

Heating by lime in this way has the advantage that not only is heat generated uniformly through the mass but also the degree of heat is controlled by the fact that around 425° C. calcium hydroxide decomposes into lime and steam with the absorption of heat.

The amount of lime required for the destructive distillation of concentrated black liquor containing about 50% by weight of solid matter is around 1.5 lbs. of lime to each pound of liquor.

The destructive distillation of the black liquor ordinarily provides ample carbon for the reduction not only of the sulphate in the black liquor but also such sulphate as is added to make up the losses in the process. More carbon may be added if desirable.

Hence in addition to lime all that is usually required to be added is sodium sulphate.

The main reactions involved are as follows:

(1) During destructive distillation.

$$CaO+H_2O=Ca(OH)_2.$$

(2) During reduction of sulphate.

$$Na_2SO_4+2Ca(OH)_2+2C=$$
$$Na_2S+2CaCO_3+2H_2O.$$

(3) During lixiviation.

$$Na_2CO_3+CaO+H_2O=2NaOH+CaCO_3.$$

The sludge consists largely of a mixture of calcium carbonate and hydroxide and may be reburned to form lime.

While it is preferable to use lime as the source of heat for destructively distilling the black ash, externally applied heat may be employed, as, for example, by the method and apparatus described in my prior Patent No. 1,197,983, issued September 12th, 1916. In such a case, the lime should ordinarily be added after destructive distillation since one of the chief products of such distillation is carbon dioxide and this would combine with lime and so render a part of it useless in the further steps of the process.

When lime is added after destructive distillation, it is preferably added in an amount only sufficient to absorb the carbon dioxide formed by the reduction of the sodium sulphate.

The lime required to causticize the sodium carbonate will then be added at the time of lixiviation. This will avoid heating and cooling the lime for causticization which would occur if the entire amount of lime required was added prior to the reduction step.

As the reduction of sodium sulphate does not take place ordinarily below 950° C. at which temperature all of the sodium salts present are molten, it necessarily follows that the product of the smelter heretofore has been fluid.

By using lime, however, the fusion of the entire mass is avoided since the temperature at no time need exceed 700° and neither sodium carbonate or sulphate melt below 840° C.

This drop in operating temperature and the avoidance of fusion of the product is of great practical importance since fused carbonate and other salts at high temperatures have a strong corrosive action on the lining of the smelter. Further, there is considerable loss of sodium salts in the smelter now used due to volatilization. Some sodium salts are also carried off mechanically by the furnace gases.

In addition to reducing the temperature of operation the number of units required for carrying out the regeneration is materially reduced as will be evident by comparing the two flow sheets shown in the drawings.

I am aware that numerous details of the process may be varied through a wide range without departing from the spirit of this invention, and I do not desire limiting the patent granted otherwise than as necessitated by the prior art.

I claim as my invention:

1. The process of regenerating black liquors from the sulphate pulp process including destructively distilling the solid matter in such liquor, heating the residual salts with lime and carbonaceous material sufficient to reduce the sodium sulphate present, the temperature being above the minimum required to reduce the sulphate in the presence of lime and below the temperature at which calcium carbonate dissociates, and lixiviating the product.

2. The process of regenerating black liquors from the sulphate pulp process including concentrating the black liquor, adding sufficient burned lime to raise the temperature sufficiently to destructively distill the organic constituents of the black liquor, raising the temperature of the residual mixture to above the minimum required to reduce sodium sulphate in the presence of lime and below the temperature at which calcium carbonate dissociates and lixiviating the product.

3. The process of regenerating black liquors from the sulphate pulp process including destructively distilling the solid matter in such liquor in the presence of lime, raising the temperature of the residual mixture to above the minimum required to reduce sodium sulphate in the presence of lime and below the temperature at which calcium carbonate dissociates, and lixiviating the product.

4. The process of regenerating black liquors from the sulphate pulp process which includes concentrating the black liquor, adding lime thereto to combine with the water and thereby create sufficient heat to distill off valuable volatile products of decomposition and then raising the temperature of the mixture out of access of air to reduce the sodium sulphate to sulphide, which process also includes the addition of further quantities of sodium sulphate prior to such addition.

5. The process of regenerating black liquors from the sulphate pulp process which includes calcining the residues from the black liquor obtained in the manufacture of pulp from wood by the sulphate process and lime in the presence of carbonaceous material with exclusion of air at a temperature below 900° C. until the sulphate is substantially reduced to sulphide, and then leaching this reduced product to from a solution of sodium hydroxide and sodium sulphide, the quantity of lime added being sufficient not only to combine with the carbon dioxide formed by the reduction of the sulphate but also to causticize the sodium carbonate upon the addition of water to the mixture.

In testimony whereof I have hereunto subscribed my name.

ALFRED H. WHITE.